June 25, 1929. E. L. BOWKER 1,718,628
ELECTRICAL CONNECTER FOR AUTOMOBILE SIGNALS
Filed Jan. 12, 1923
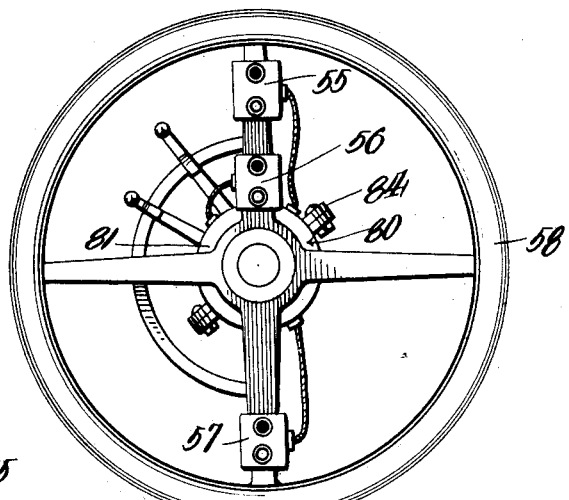
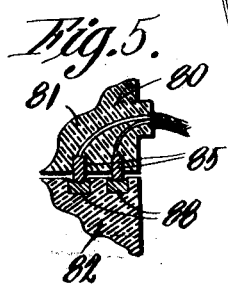
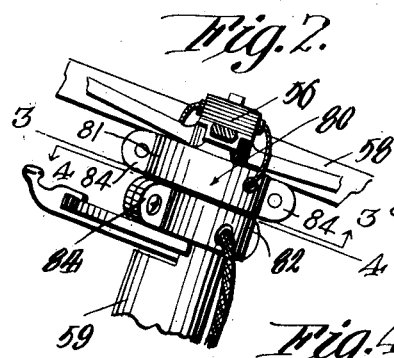
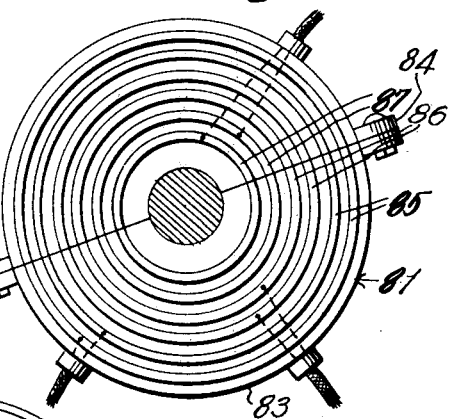
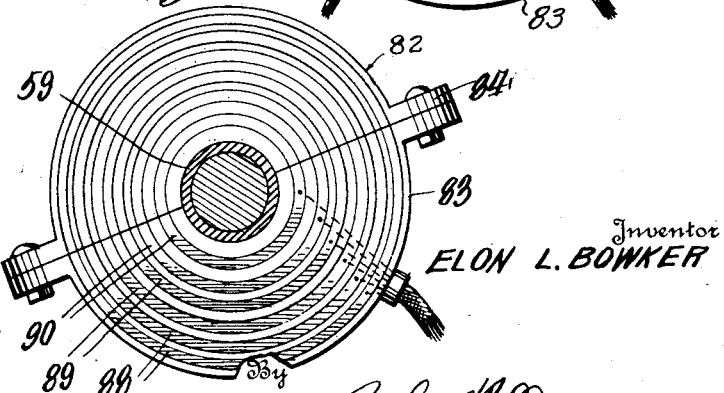
Inventor
ELON L. BOWKER Patented June 25, 1929.

1,718,628

UNITED STATES PATENT OFFICE.

ELON LIONEL BOWKER, OF LOS ANGELES, CALIFORNIA.

ELECTRICAL CONNECTER FOR AUTOMOBILE SIGNALS.

Application filed January 12, 1923. Serial No. 612,179.

This invention relates to signals and more particularly to direction signals or indicators for motor vehicles and the primary object of the invention is to provide a novel and simple current conductor for automobile direction indicators of the type having side signalling lamps both at the front and rear of the vehicle.

Another object of the invention is to provide switch members carried by the steering wheel of the vehicle for controlling the illumination of signal light housings and novel means connected with the steering wheel for preventing the twisting and turning of the wires leading from the switches during the turning movement of the steering wheel.

With these and other objects in view, the invention consists in the novel construction, arrangement and formation of parts, as will be hereinafter more specifically described, claimed and illustrated in the accompanying drawings forming a part of this specification, in which drawings:

Figure 1 is a top plan view of a motor vehicle steering wheel showing the means of connecting the controlling switches for the various signal light housings thereto.

Figure 2 is a fragmentary side elevation of a steering wheel showing parts thereof in section and illustrating the novel means carried by the steering wheel and post for permitting the controlling of the lamps in the light signalling housings from the steering wheel without twisting the various conductor wires, Figure 3 is a detail section taken on the line 3—3 of Figure 2 looking in the direction of the arrows, Figure 4 is a detail section taken on the line 4—4 of Figure 2 looking in the direction of the arrows, Figure 5 is a fragmentary section through the novel means carried by the steering wheel column for permitting the connection of the control switch members with lamps in signalling housings without the twisting of the wires.

Referring to the drawings in detail, wherein similar reference characters designate corresponding parts throughout the several views, the numeral 58 generally indicates a steering wheel of conventional construction and 80 the novel current conducting mechanism, which will now be described.

This mechanism 80 includes an upper block 81 which is secured to the steering wheel 58 for rotary movement therewith and a lower block 82 which is connected with the outer wall or column 59 of the steering post. Each of these blocks 81 and 82 is formed of insulating material such as hard rubber or the like and each includes semi-circular portions 83 having laterally extending ears 84 which are adapted to abut when the portions 83 are placed about the steering post and steering column. The upper block 81 has embedded in its lower face three pairs of concentric conducting rings 85, 86 and 87 and these rings protrude slightly below the lower face of the upper block 80 and are adapted to engage similar pairs of conducting rings 88, 89 and 90. These rings are embedded in the lower block 82 and have their upper faces extending slightly below the upper face of the lower block 82 and are of a concave form. The outer faces of the pairs of rings 85, 86 and 87 are of a convex form and these pairs of rings 85, 86, 87 and 88, 89 and 90 are adapted to have a rubbing contact with one another during the turning movement of the steering wheel.

It is preferred to have the wires of the switch 55 connected to the outer pair of rings 85 and the wires for the lamp casing on the front end of the vehicle and the left-hand signal at the rear of the vehicle connected to the outer pair of rings 88. The wires of the switch 56 are connected to the intermediate pair of rings 86 while the wires for the stop signal are connected to the intermediate pair of rings 89. The wires of the switch 57 are connected to the inner pair of rings 87, and the wires for the signal for the front of the vehicle at the right hand side thereof and the signal at the rear of the vehicle on the right hand side thereof are connected to the inner pair of rings 90.

By this construction it can be seen that the current is permitted to flow through the rings without danger of the twisting of the conducting wires.

From the foregoing description it can be seen that I have provided an improved current conducting device for an automobile direction indicator which will effectively prevent twisting of the current conducting wires during the usual manipulation of the steering wheel.

Changes in details may be made without departing from the spirit or scope of this invention.

What I claim as new is:—

In a vehicle direction signal, a current conveying means for the steering gear of the vehicle comprising a lower non-rotatable block of insulation consisting of a pair of companion semi-circular sections adapted to be fitted about the steering column of said gear, companion ears formed on the sections, means connecting the ears together for clamping the sections on the steering column against movement, an upper block of insulation rotatable relative to the lower block, means for rigidly securing the upper block to the steering wheel of said gear for movement therewith, a plurality of pairs of concentrically arranged rings of conducting material embedded in the opposing faces of the blocks, the rings of the lower block having concave upper sides located below the upper face of the block, the rings of the upper block extending below the lower face of the block and having convex lower sides contacting with the concave sides of the rings of the lower block, and conductors embedded in the blocks and connected to the rings and extending therefrom to and beyond the lateral sides of the blocks.

In testimony whereof I affix my signature.

ELON LIONEL BOWKER.